Patented Mar. 30, 1943

2,315,197

UNITED STATES PATENT OFFICE 2,315,197

METHOD OF PREPARING ALKYLATED HYDROCARBONS FROM NORMAL PARAFFINIC HYDROCARBONS

Arthur R. Goldsby, Port Arthur, Tex., and Karl Korpi, Redondo Beach, Calif., assignors, by mesne assignments, to The Texas Company, New York, N. Y., a corporation of Delaware No Drawing. Application July 24, 1937, Serial No. 155,436

7 Claims. (Cl. 196—10)

This invention relates to the preparation of motor fuel hydrocarbons and has to do particularly with the manufacture of iso-paraffins from normal paraffins and an olefin.

It has been found that an iso-paraffin, such as iso-butane, may be reacted with olefins to produce reactions of the nature of alkylation whereby higher boiling iso-paraffins may be formed. But in some cases, such as with di-butylene or di-isobutylene, iso-paraffins may be reacted with olefins to produce reactions whereby iso-paraffins of approximately the same molecular weight as the olefin may be formed. It has also been found that normal paraffins, such as butane, may be isomerized under proper conditions to iso-paraffins, such as iso-butane.

The present invention contemplates a combination of the isomerization and alkylation reactions outlined above whereby iso-paraffins may be produced from normal paraffins and olefins. In general, different catalysts and/or conditions are required for isomerization than for alkylation, and accordingly the operation may be carried out in a series of steps or stages whereby the normal paraffin is first isomerized to an iso-paraffin in the presence of a suitable catalyst, and then the iso-paraffin reacted with the desired olefin in another stage in the presence of another catalyst adapted to effect alkylation or union between the iso-paraffin and olefin.

Catalysts which are contemplated in the process include the chlorides, bromides, iodides, and fluorides of metallic elements, such as aluminum, chromium, and iron, and mineral acids, such as sulfuric acid, either alone or in combination or impregnated on a suitable supporting material. In general, materials of the first group are preferred for isomerizing catalysts, while those in the second group are preferred alkylation catalysts.

In practicing the invention normal butane or a charging stock containing a substantial amount of normal butane is isomerized and reacted with a suitable olefin. In continuous operation the unreacted normal butane may be recycled to the system. The olefins employed may be pure materials or mixtures, such as obtained from the polymerization of olefins or from cracking. The olefins may range from normally gaseous hydrocarbons to liquid materials boiling within the gasoline and kerosene ranges, including cracked gases, cracked distillates, polymer gasoline, di-isobutylene, di-butylene, etc. We prefer to use as the olefin charge an unsaturated $C_4$ fraction obtained from cracking.

According to a preferred method of operation, the normal butane is charged to a reduction zone and treated in the presence of a catalyst, such as a metallic halide, to effect isomerization of the normal butane to iso-butane. The catalyst is then separated and also, if desired, any undesirable higher or lower boiling hydrocarbons. The iso-butane is then reacted with the olefins in the presence of an alkylating catalyst, such as a mineral acid. The alkylation products may be separated, for example, by fractional distillation and the unreacted materials recycled.

In some cases it may be desirable to feed the normal butane and isomerization catalyst to a reaction zone whereby isomerization is allowed to proceed entirely or in part, and then the olefin and alkylation catalyst fed into the reaction products after the desired isomerization reaction has been effected, and then the necessary separation of the reaction products and recycling of unreacted materials may be accomplished.

The feature of feeding an olefinic fraction into isomerization products comprising a mixture of iso-butane with at least an equal amount of normal butane, in the presence of a combined isomerization-alkylation catalyst comprising an aluminum halide, under conditions including the maintenance of an excess of isobutane to olefin such that isobutane is alkylated with the olefin, and at a temperature below a normal cracking temperature and below that at which normal butane is isomerized in any substantial amount to isobutane with an aluminum halide catalyst in the absence of the said alkylation reaction taking place therein, is disclosed and claimed in the copending application of Arthur R. Goldsby and Karl Korpi, Serial No. 437,198, filed April 1, 1942.

The following example will serve as an illustration of the operation of the invention:

Normal butane, under atmospheric pressure or sufficient pressure to maintain a liquid phase, was reacted for around forty hours with about 10% aluminum bromide. The reaction products were distilled and the distillate containing about 50% iso-butane was then treated in the presence of about 50% by volume of sulfuric acid of about 94% $H_2SO_4$ concentration, with a $C_4$ hydrocarbon fraction of about 40% unsaturation in such a ratio that the iso-butane content of the charge was about equal to the total olefin content. The temperature of both the isomerization and the alkylation reactions were maintained at about 75-85° F. The acid was separated, the reaction products neutralized and fractionally distilled. The yield of motor fuel of approximately 88 octane was about theoretical, based on the butylenes reacting.

The process may be operated batch-wise or continuous. In a continuous operation recirculation is desirable, since the time of reaction and conversion per pass are greatly reduced. The amount of isomerization catalyst may vary considerably but preferably runs between about 10 and 20% by volume. A hydrocarbon metallic halide complex may be used to advantage. The amount of alkylation catalyst may also vary, and amounts between 5 and 100% by volume may be used successfully, depending on the degree of contact, time of reaction, etc. The concentration of acid in the alkylation catalyst should be within the effective alkylation range, and preferably about 94-100%. The time required for the isomerization may range from a few minutes to about 50 hours, depending on the temperature, which may range from about 75° F. or below up to about 400° F. when operating on normally gaseous hydrocarbon stocks. It is preferable to operate the alkylation at temperatures of about 70-100° F. It is also desirable to maintain the iso-butane content of the charge at least about equal in weight to that of the olefins, although much larger amounts of iso-butane may be used, for example, up to two or three times the olefin content.

Obviously many modifications and variations of the invention, as hereinbefore set forth, may be made without departing from the spirit and scope thereof, and therefore only such limitations should be imposed as are indicated in the appended claims.

We claim:

1. A process for the manufacture of saturated liquid hydrocarbons of high antiknock value which comprises subjecting normal butane to an isomerization operation whereby the normal butane is partially converted in substantial amount to isobutane, treating said isobutane, in mixture with unconverted normal butane, with olefins under alkylating conditions whereby the isobutane is condensed with the olefins to form normally liquid isoparaffins, separating normal butane from the reaction products and recycling said normal butane to the isomerization operation.

2. A process according to claim 1 in which the olefin fraction is an unsaturated $C_4$ hydrocarbon fraction.

3. A process according to claim 1 in which the isomerization operation is carried out in the presence of an isomerization catalyst comprising aluminum chloride.

4. A process according to claim 1 in which the alkylating conditions involve use of an alkylation catalyst comprising strong sulfuric acid.

5. A process according to claim 1 in which the isobutane available for the alkylation reaction is in excess of the olefins by weight.

6. A process according to claim 1 in which the isomerization operation is carried out in the presence of an isomerization catalyst and the isomerized product is separated from the isomerization catalyst and also from any products of higher and lower boiling points than the isobutane and unconverted normal butane prior to subjecting the isomerized product to the said alkylating conditions.

7. A process for the manufacture of saturated liquid hydrocarbons of high anti-knock value which comprises subjecting normal butane to isomerization in the presence of an isomerization catalyst under conditions effective to partially convert the normal butane in substantial amount to isobutane, separating from the reaction products the hydrocarbon material comprising a substantial proportion of isobutane and unreacted normal butane, subjecting the said hydrocarbon material to reaction with an olefin in the presence of an alkylation catalyst under alkylating conditions to effect alkylation of isobutane with the olefin to produce saturated liquid hydrocarbons of high anti-knock value, separating from the reaction products the said liquid hydrocarbons and also unreacted normal butane, and recycling at least a portion of the unreacted normal butane to the said isomerization step.

ARTHUR R. GOLDSBY.
KARL KORPI.